(12) United States Patent
Matsumoto et al.

(10) Patent No.: US 12,025,805 B2
(45) Date of Patent: Jul. 2, 2024

(54) IMAGE DISPLAY DEVICE

(71) Applicant: SEIKO EPSON CORPORATION, Tokyo (JP)

(72) Inventors: Daiki Matsumoto, Suwa (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/227,650

(22) Filed: Jul. 28, 2023

(65) Prior Publication Data

US 2024/0036319 A1 Feb. 1, 2024

(30) Foreign Application Priority Data

Jul. 29, 2022 (JP) .................................. 2022-121347

(51) Int. Cl.
 *G02B 27/01* (2006.01)
(52) U.S. Cl.
 CPC ..... *G02B 27/0172* (2013.01); *G02B 27/0176* (2013.01); *G02B 2027/0178* (2013.01)

(58) Field of Classification Search
 CPC ........ G02B 2027/0178; G02B 27/0172; G02B 27/0176; G02B 27/017
 See application file for complete search history.

(56) References Cited

U.S. PATENT DOCUMENTS

2020/0310118 A1\* 10/2020 Kamakura ............ G06F 1/1647
2023/0027493 A1\* 1/2023 Shams ................. G02B 6/0088

FOREIGN PATENT DOCUMENTS

JP 2017-211674 A 11/2017

\* cited by examiner

*Primary Examiner* — Koosha Sharifi-Tafreshi
(74) *Attorney, Agent, or Firm* — Oliff PLC

(57) ABSTRACT

An image display device includes: a display unit including a projection optical system and a combiner in an integrated state; and a frame configured to support the display unit, in which the display unit includes an upper portion that is in contact with a periphery of an opening of the frame and is fixed in a hung state, and the frame includes, at an upper side, a recessed portion at which a circuit member is disposed.

12 Claims, 7 Drawing Sheets

IMAGE DISPLAY DEVICE

The present application is based on, and claims priority from JP Application Serial Number 2022-121347, filed on Jul. 29, 2022, the disclosure of which is hereby incorporated by reference herein in its entirety.

BACKGROUND

1. Technical Field

The present disclosure relates to an image display device that enables a virtual image to be observed, and in particular, relates to an image display device including a combiner.

2. Related Art

As an image display device, there is a device that includes an optical member having optical transparency and disposed in front of eyes, thereby making it possible to observe image light and external light at the same time. For example, a virtual image display device is publicly available in JP-A-2017-211674. The virtual image display device has a structure that includes an image element, a projection lens, and a light-guiding device. A barrel of the projection lens and the light-guiding device are supported by a frame extending above both eyes. In addition, an end portion of the light-guiding device is fitted into the barrel of the projection lens.

In a case of the device disclosed in JP-A-2017-211674 described above, it is not easy to maintain the highly accurate alignment of the projection lens and the light-guiding device. Furthermore, the optical system for the left eye and the optical system for the right eye are disposed so as to be assembled to the frame. This leads to a possibility that these optical systems are affected by manufacturing tolerances or assembly tolerances to the frame.

SUMMARY

An image display device according to one aspect of the present disclosure includes a display unit including a projection optical system and a combiner in an integrated state, and a frame configured to support the display unit, in which the display unit includes an upper portion that is in contact with a periphery of an opening of the frame and is fixed in a hung state, and the frame includes, at an upper side thereof, a recessed portion at which a circuit member is disposed.

DESCRIPTION OF EXEMPLARY EMBODIMENTS

Below, an embodiment of an image display device according to the present disclosure will be described with reference to FIGS. 1 and 2 or the like.

Figure 1:
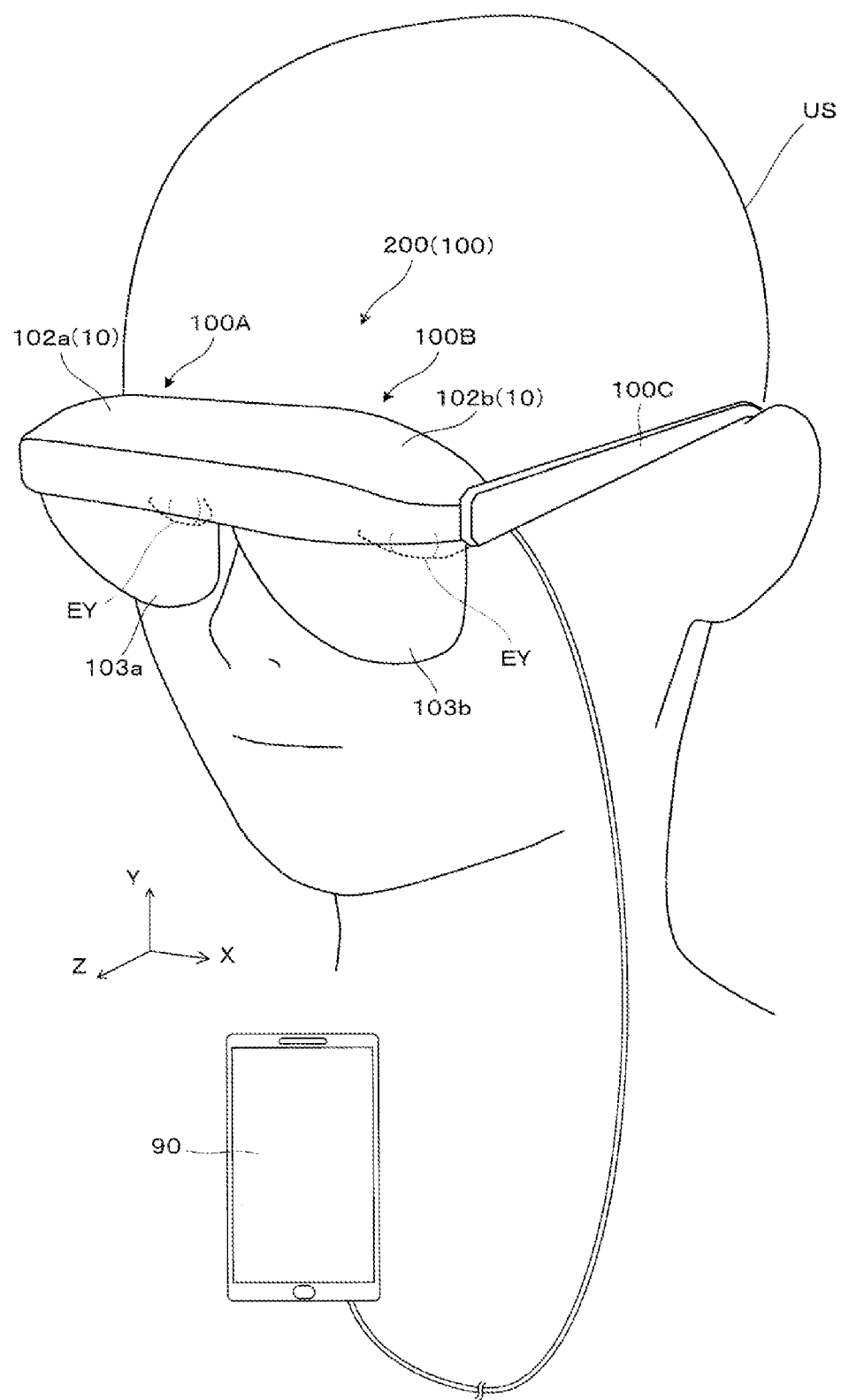
FIG. 1 is a perspective view of the external appearance illustrating a state in which an image display device according to an embodiment is worn.

FIG. 1 is a diagram showing a mounted state of a head-mounted display (hereinafter, also referred to as "HMD") 200, and the HMD 200 allows an observer or wearer US who is wearing the HMD 200 to recognize an image as a virtual image. In FIG. 1 or the like, X, Y, and Z indicate an orthogonal coordinate system. The +X direction corresponds to a lateral direction in which both eyes EY of the observer or wearer US who wears the HMD 200 or an image display device 100 are arrayed. The +Y direction corresponds to an upward direction orthogonal to the lateral direction in which both eyes EY of the wearer US are arrayed. The +Z direction corresponds to a forward or front direction with respect to the wearer US. The ±Y directions are parallel to the vertical axis or the vertical direction.

The HMD 200 includes a first display device 100A for the right eye, a second display device 100B for the left eye, a pair of support devices 100C having a temple shape and configured to support the display devices 100A and 100B, and a user terminal 90 serving as an information terminal. The first display device 100A alone functions as an image display device, and is comprised of a first display driving unit 102a disposed at an upper portion, and a first combiner 103a having an eyeglass-lens shape and covering the front of an eye.

Similarly, the second display device 100B alone also functions as an image display device, and is comprised of a second display driving unit 102b disposed at an upper portion, and a second combiner 103b having an eyeglass-lens shape and covering the front of an eye. The support device 100C is a mounting member mounted at a head of the wearer US, and supports the upper end side of the pair of combiners 103a and 103b through the display driving units 102a and 102b that are integrated from the viewpoint of the external appearance. The first display device 100A and the second display device 100B are optically identical to each other or are inverted left and right, and detailed explanation of the second display device 100B will not be given.

Figure 2:
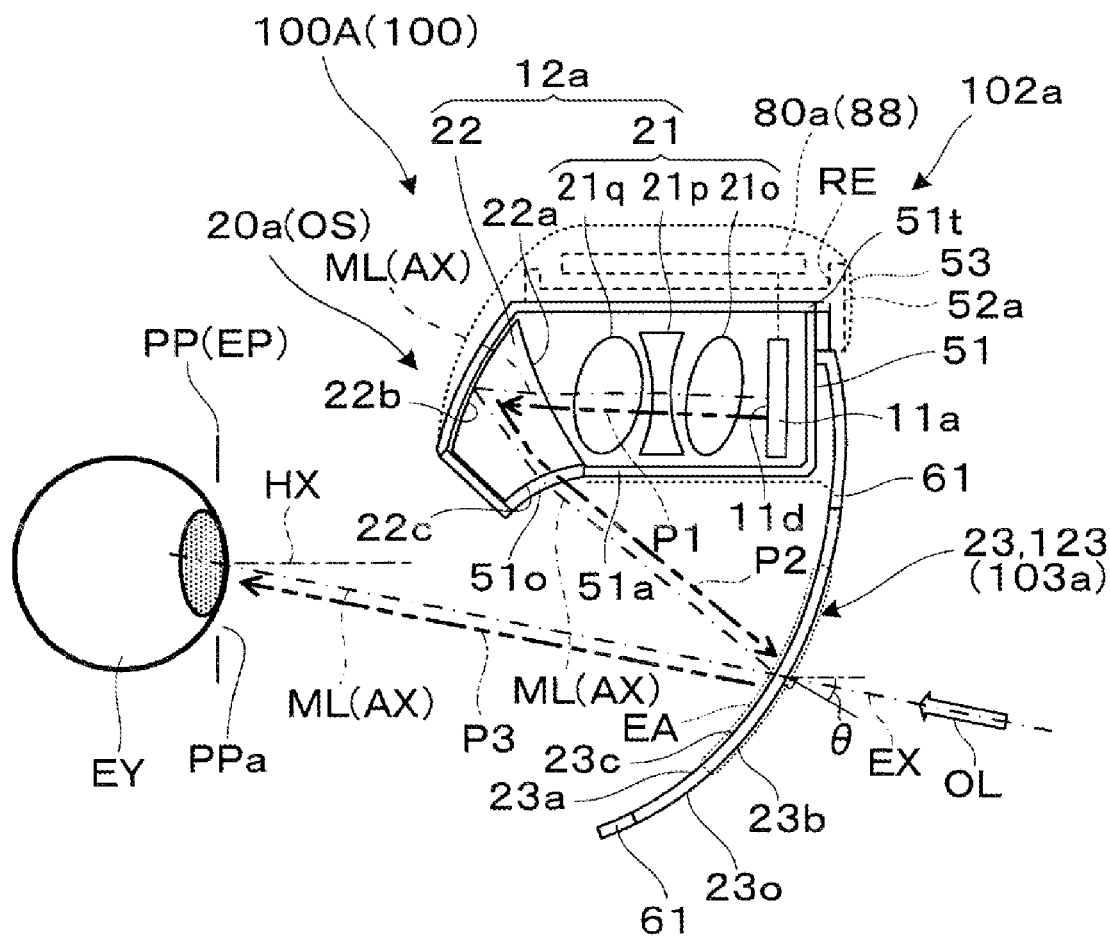
FIG. 2 is a side cross-sectional view illustrating an internal structure of an optical system of a display device at one side.

FIG. 2 is a side cross-sectional view illustrating an optical structure of the first display device 100A. The first display device 100A includes a first image element 11a, a first display unit 20a, and a first circuit member 80a. The first image element 11a is an image-light generating device. The first display unit 20a is an image-formation optical system configured to form a virtual image, and includes a projection lens 21, a prism mirror 22, and a see-through mirror 23 in an integrated state. Of the first display unit 20a, the projection lens 21 and the prism mirror 22 function as a first projection optical system 12a where image light ML from the first image element 11a enters, and the see-through mirror 23 functions as a partial transmissive mirror 123 configured to partially reflect, toward a pupil position PP or an eye EY, the image light ML outputted from the first projection optical system 12a. The first display unit 20a includes the first projection optical system 12a and the first combiner 103a in an integrated state. The projection lens 21 and the prism mirror 22 that constitute the first projection optical system 12a correspond to a first optical element and a second optical element, respectively, where moving-image light or image light ML enters. In addition, the first image element 11a, the projection lens 21, and the prism mirror 22 correspond to a portion of the first display driving unit 102a illustrated in FIG. 1, and the see-through mirror 23 corresponds to the first combiner 103a illustrated in FIG. 1. The see-through mirror 23 has an external shape that protrudes outward. The projection lens 21 and the prism mirror 22 that constitute the first projection optical system 12a are fixed within a barrel 51 in a state of being aligned to each other together with the first image element 11a.

The barrel 51 that accommodates an optical element that constitutes the projection lens 21 or the like is supported by a first frame 52a, and is disposed at a lower side of the first frame 52a. The first frame 52a is also covered with a cover 53, and the barrel 51 is also entirely covered with the cover 53. The first frame 52a is made of a metal material. The barrel 51 and the cover 53 are each made of a resin material having a light shielding property, and one surface of the prism mirror 22 is exposed at an opening 51a of the barrel 51. The barrel 51 includes an upper portion 51u that is in contact with the first frame 52a so as to be fitted into the first frame 52a, and is fixed to the first frame 52a in a hung state. Thus, the first display unit 20a is configured such that the upper portion 51u is in contact with the first frame 52a so as to be fitted into it, and is fixed to the first frame 52a in a hung state. The first frame 52a includes, at an upper side thereof, a recessed portion RE at which a first circuit member 80a is disposed.

In the first display device 100A, the first image element 11a is an image-light generating device of a self-luminous type. The first image element 11a outputs the image light ML to the first projection optical system 12a. The barrel 51 accommodates the first image element 11a together with the optical elements such as the projection lens 21, and supports them. The first image element 11a is, for example, an organic electro-luminescence (EL) display, and forms a color still image or moving image on a two-dimensional display surface 1id. The first image element 11a is driven by a first circuit member 80a, specifically, by a display control device 88 to perform a display operation. The first image element 11a is not limited to the organic EL display, and may be replaced with a display device using inorganic EL, an organic LED, an LED array, a laser array, a quantum dot light emission element, or the like. The first image element 11a is not limited to the image-light generating device of a self-luminous type, and it may be possible to employ a device including an LCD or other light modulating elements and illuminating the light modulating elements using a light source such as backlight to form an image. As for the first image element 11a, it may be possible to use liquid crystal on silicon (LCOS, LCoS is a registered trademark), a digital micro-mirror device, or the like, instead of the LCD.

In a case of the present embodiment, the first display unit 20a includes two reflection surfaces, and the optical path is bent by the see-through mirror 23 and the prism mirror 22. The first display unit 20a is configured as an off-axis optical system OS. The projection lens 21, the prism mirror 22, and the see-through mirror 23 are disposed to be non-axially symmetrical, and include an optical surface that is non-axially symmetrical. In this first display unit 20a, the optical axis AX is bent within the off-axis surface (that is, the reference plane) parallel to the Y-Z plane, and the optical elements 21, 22, and 23 are arrayed along this off-axis surface. Specifically, in the off-axis surface (that is, the reference plane) parallel to the Y-Z plane, an optical path P1 from the projection lens 21 to an inner reflection surface 22b, an optical path P2 from the inner reflection surface 22b to the see-through mirror 23, and an optical path P3 from the see-through mirror 23 to the pupil position PP are disposed so as to be bent in a Z shape in two stages. Thus, the line normal to the see-through mirror 23 at the central portion thereof where the optical axis AX intersects forms an angle of approximately $\theta$=40 to 50° relative to the Z direction. In this first display unit 20a, the optical elements 21, 22, and 23 that constitute the first display device 100A are arrayed at various height positions in the vertical direction. This makes it possible to prevent an increase in the lateral width of the first display device 100A. In addition, as the optical path is reflected and bent at the prism mirror 22 and the like, the optical path portions P1 to P3 are disposed so as to be bent in a Z shape in two stages. In addition, the optical path portions P1 to P3 extend relatively close to the horizon. Thus, it is possible to reduce the size of the first display unit 20a in the vertical direction or the front-rear direction. Furthermore, as the angle $\theta$ of inclination of the see-through mirror 23 at the central portion thereof falls in a range of 40 to 50°, the angle of the optical path portion P2 relative to the Z-axis falls in a range of 70° to 90° on the assumption that the angle of the optical path portion P3 corresponding to the line-of-sight is constant. This makes it easy to reduce the thickness of the image display device 100 in the Z direction.

Of the first display unit 20a, the optical path portion P1 from the projection lens 21 to the inner reflection surface 22b extends in a slightly obliquely upward direction toward the rearward with the eyepoint being the reference, or extends in a direction substantially parallel to the Z direction. The optical path portion P2 from the inner reflection surface 22b to the see-through mirror 23 extends in an obliquely downward direction toward the frontward. The inclination of the optical path portion P2 is larger than the inclination of the optical path portion P1 when the horizontal direction (X-Z plane) is the reference. The optical path portion P3 from the see-through mirror 23 to the pupil position PP extends in a slightly obliquely upward toward the rearward or a direction close to parallel to the Z direction. In the example illustrated in the drawing, a portion of the optical axis AX that corresponds to the optical path portion P3 is at approximately −10° toward the +Z direction with the downward being a minus. In other words, the partial transmissive mirror 123 reflects the image light ML such that the optical axis AX or the optical path portion P3 is directed at a predetermined angle, that is, is directed upward at approximately 10°. Thus, an exit optical axis EX obtained by extending a portion of the optical axis AX that corresponds to the optical path portion P3 extends so as to be tilted downward by approximately 10° relative to the central axis HX parallel to the +Z direction at the front. This is because the line-of-sight of a human becomes stable if eyes are slightly downcast with the line-of-sight being tilted toward the lower side by approximately 10° relative to the horizontal direction. Note that the central axis HX that extends in the horizontal direction with respect to the pupil position PP is set on the assumption that the wearer US who wears the first display device 100A relaxes in an upright posture and faces the front and gazes at the horizontal direction or the horizontal line.

Of the first display unit 20a, the projection lens 21 includes a first lens 21o, a second lens 21p, and a third lens 21q. The projection lens 21 receives the image light ML outputted from the first image element 11a to cause the light to enter the prism mirror 22. The projection lens 21 collects the image light ML outputted from the first image element 11a to make it into a state close to a collimated light beam. The optical surfaces, that is, the incident surfaces and the output surfaces of the first lens 21*o*, the second lens 21*p*, and the third lens 21*q* that constitute the projection lens 21 are free-form surfaces or aspherical surfaces. These surfaces are asymmetrical with the optical axis AX being interposed and in terms of the vertical direction intersecting the optical axis AX and extending parallel to the Y-Z plane, and are symmetrical with the optical axis AX being interposed and in terms of the lateral direction or the X direction. The first lens 21*o*, the second lens 21*p*, and the third lens 21*q* are made, for example, of resin. However, these lenses may be made of glass. An anti-reflection film may be formed on the optical surfaces of the first lens 21*o*, the second lens 21*p*, and the third lens 21*q* that constitute the projection lens 21.

The prism mirror 22 is an optical member having a refractive reflection function having a function of combining a mirror and a lens, and reflects the image light ML from the projection lens 21 while refracting it. The prism mirror 22 includes an incident surface 22*a* corresponding to an incidence part, an inner reflection surface 22*b* serving as a reflection surface corresponding to a reflection section, and an output surface 22*c* corresponding to an output portion. The prism mirror 22 outputs the image light ML entered from the front, so as to be bent in a direction tilted downward with respect to a direction in which the incident direction is inverted (a direction of the light source as viewed from the prism mirror 22). The incident surface 22*a*, the inner reflection surface 22*b*, and the output surface 22*c* that are the optical surfaces constituting the prism mirror 22 are asymmetrical with the optical axis AX being interposed and in terms of the vertical direction intersecting the optical axis AX and extending parallel to the Y-Z plane, and are symmetrical with the optical axis AX being interposed and in terms of the lateral direction or the X direction. The optical surfaces of the prism mirror 22, that is, the incident surface 22*a*, the inner reflection surface 22*b*, and the output surface 22*c* are, for example, free-form surfaces. The incident surface 22*a*, the inner reflection surface 22*b*, and the output surface 22*c* are not limited to free-form surfaces, and may be aspherical surfaces. The prism mirror 22 is made, for example, of resin. However, the prism mirror 22 may be made of glass. The inner reflection surface 22*b* is not limited to one that reflects the image light ML by total reflection, and may be a reflection surface formed of a metal film or a dielectric multilayer film. In this case, a reflection film including a single layer film or a multilayer film made of a metal such as Al or Ag is formed on the inner reflection surface 22*b* through vapor deposition or the like, or a sheet-shaped reflection film made of a metal is affixed thereto. Although detailed illustration is given, an anti-reflection film may be formed on the incident surface 22*a* and the output surface 22*c*.

The see-through mirror 23, that is, the first combiner 103*a* is a curved sheet-like reflection optical member functioning as a concave front surface mirror, and is configured to reflect the image light ML from the prism mirror 22 and partially transmit outside light OL. The see-through mirror 23 reflects, toward the pupil position PP, the image light ML from the prism mirror 22 disposed in an exit region of the first projection optical system 12*a*. The see-through mirror 23 includes a reflection surface 23*c* and an external side surface 23*o*.

The see-through mirror 23 partially reflects the image light ML, and enlarges an intermediate image formed at the light exit side of the prism mirror 22. The see-through mirror 23 is a concave surface mirror having a concave shape toward the pupil position PP while having a convex shape toward the outside, and is configured to cover the pupil position PP at which an eye EY or pupil is disposed. The pupil position PP or an opening PPa thereof is called an eye point or an eye box. The pupil position PP or the opening PPa corresponds to an exit pupil EP, at an exit side, of the first display unit 20*a*. The see-through mirror 23 is a collimator, and is configured to converge, on the pupil position PP, the main beam of the image light ML outputted from each point on the display surface 11d and expanding once after an image is formed in the vicinity of the exit side of the prism mirror 22 of the first projection optical system 12*a*. The see-through mirror 23 serves as a concave surface mirror, and makes it possible to view an intermediate image (not illustrated) in an enlarged manner, the intermediate image being formed by the first image element 11*a* serving as an image-light generating device and formed again by the first projection optical system 12*a*. More specifically, the see-through mirror 23 functions in a manner similar to a visual field lens, and causes the image light ML from each point of an intermediate image (not illustrated) formed at a stage subsequent to the output surface 22*c* of the prism mirror 22, to enter the pupil position PP so as to be collected as a whole at the pupil position PP in a collimated state. At a viewpoint disposed between the intermediate image and the pupil position PP, the see-through mirror 23 needs to have the spread equal to or greater than an effective region EA corresponding to the angle of view (upward, downward, left, and right visual field angles are added together with the optical axis AX extending in a front direction of an eye being the reference). The external region of the see-through mirror 23 that extends outwardly beyond the effective region EA has any surface shape as it does not directly affect the formation of an image. However, from the viewpoint of achieving the external appearance having an eyeglass lens shape, it is desirable that the surface shape have the same curvature as the surface shape of the outer edge of the effective region EA or continuously change from this outer edge.

The see-through mirror 23 is a semitransparent type mirror plate having a structure in which a transmissive reflection film 23*a* is formed on a rear surface of a plate-shaped body 23*b*. A reflection surface 23*c* of the see-through mirror 23 is asymmetrical with the optical axis AX being interposed and in terms of the vertical direction intersecting the optical axis AX and extending parallel to the Y-Z plane, and is symmetrical with the optical axis AX being interposed and in terms of the lateral direction or the X direction. The reflection surface 23*c* of the see-through mirror 23 is, for example, a free-form surface. The reflection surface 23*c* is not limited to the free form surface, and may be an aspherical surface. The reflection surface 23*c* needs to have the spread equal to or greater than the effective region EA. When the reflection surface 23*c* is formed at an external region larger than the effective region EA, a difference in view is less likely to occur between the outside-world image from behind the effective region EA and the outside-world image from behind the external region.

The reflection surface 23*c* of the see-through mirror 23 transmits a portion of light at the time of reflecting the image light ML. Thus, as the external light OL passes through the see-through mirror 23, the outside can be viewed in a see-through manner, and a virtual image can be superimposed on the outside-world image. At this time, when the plate-shaped body 23*b* is thin and has a thickness equal to or less than approximately several millimeters, it is possible to reduce a change in magnification of the outside-world image. From the viewpoint of ensuring a brightness of the image light ML and facilitating observation of the outside-world image by see-through, a reflectance of the reflection surface 23c with respect to the image light ML and the external light OL is set to not less than 10% and not more than 50% in a range of an incident angle (corresponding to the effective region EA) of the assumed image light ML. The plate-shaped body 23b which is a base material of the see-through mirror 23 is made, for example, of resin, and may also be made of glass. The plate-shaped body 23b is made of the same material as the support plate 61 that supports the plate-shaped body 23b from the periphery, and has the same thickness as the support plate 61. The transmissive reflection film 23a is made, for example, of a dielectric multilayer film including a plurality of dielectric layers having an adjusted film thickness. The transmissive reflection film 23a may include a single-layer film or a multilayer film made of a metal such as Al or Ag for which a film thickness has been adjusted. The transmissive reflection film 23a may be formed through stacking using deposition, for example. The transmissive reflection film 23a may also be formed by affixing a sheet-shaped reflection film. An anti-reflection film is formed on an outer surface 23o of the plate-shaped body 23b.

The optical path will be described. The image light ML from the first image element 11a enters the projection lens 21 and is outputted from the projection lens 21 in a substantially collimated state. The image light ML that has passed through the projection lens 21 enters the prism mirror 22 and passes through the incident surface 22a while being refracted. Then, the image light ML is reflected by the inner reflection surface 22b at high reflectance close to 100%, and is refracted by the output surface 22c again. The image light ML from the prism mirror 22 once forms an intermediate image, and then, enters the see-through mirror 23 to be reflected by the reflection surface 23c at reflectance equal to or less than approximately 50%. The image light ML that has been reflected by the see-through mirror 23 enters the pupil position PP where the eye EY or the pupil of the wearer US is disposed. The external light OL that has passed through the see-through mirror 23 or the support plate 61 disposed at the periphery of the see-through mirror 23 also enters the pupil position PP. In other words, the wearer US who wears the first display device 100A is able to observe a virtual image made of the image light ML so as to be superimposed on the outside-world image.

The display control device 88 illustrated in FIG. 2 is a display control circuit, and is configured to output a drive signal corresponding to an image to the first display element 11a to control a display operation of the first display element 11a. The display control device 88 includes, for example, an IF circuit, a signal processing circuit, and the like, and causes the first display element 11a to perform two-dimensional image display in accordance with image data or an image signal received from the outside. The display control device 88 may include a main substrate configured to control a first display device 100A and the second display device 100B. It is possible to configure the main substrate so as to have an interface function in which communication with the user terminal 90 illustrated in FIG. 1 is performed to perform signal conversion to a signal received from the user terminal 90, and also have an integrated function of linking the display operation of the first display device 100A and the display operation of the second display device 100B with each other. Note that the HMD 200 or the image display device 100 that does not include the display control device 88 or the user terminal 90 is also a virtual image display device.

A support structure assembled in the display driving units 102a and 102b of the HMD 200 will be described with reference to FIG. 3. In the first display device 100A, the first frame 52a is fixed to an upper portion 51t of the first display unit 20a using a fastener 50f or the like such as a screw, and supports the first display unit 20a so as to be hung. Note that, as for the method of fixing the first frame 52a, it may be possible to employ various manners including fixing using caulking, fixing using an adhesive, fixing using fitting-into, hanging using a socket type, hanging in a hooked manner, or adhesive fixing, in addition to screw fixing.

A rectangular opening 52o is formed in the first frame 52a. A portion (specifically, three sides other than the +Z side) of a periphery 52r of the rectangular opening 52o is in close contact with the upper portion 51u of the barrel 51 of the first display unit 20a. At this time, the lower face side of the first frame 52a and the upper face side of the first display unit 20a are fitted to achieve alignment between the first frame 52a and the first display unit 20a. Note that the first circuit member 80a can be disposed at the recessed portion RE of the first frame 52a. The first frame 52a is made, for example, of a magnesium alloy. With the first frame 52a being made of a magnesium alloy, it is possible to cause the first frame 52a and the first display unit 20a to have an effect of cooling through heat radiation.

In the second display device 100B, the second frame 52b is fixed to an upper portion 51t of the second display unit 20b using the fastener 50f or the like such as a screw, and supports the second display unit 20b so as to be hung. A rectangular opening 52o is formed in the second frame 52b. A portion (specifically, three sides other than the +Z side) of a periphery 52r of the rectangular opening 52o is in close contact with the upper portion 51u of the barrel 51 of the second display unit 20b. At this time, the lower face side of the second frame 52b and the upper face side of the second display unit 20b are fitted to achieve alignment between the second frame 52b and the second display unit 20b. Note that the second circuit member 80b can be disposed at the recessed portion RE of the second frame 52b. With the second frame 52b being made of a magnesium alloy, it is possible to cause the second frame 52b and the second display unit 20b to have an effect of cooling through heat radiation.

In addition to the first frame 52a and the second frame 52b, the support device 50 includes a joint 50c configured to couple the first frame 52a and the second frame 52b to relatively fix them. The joint 50c is a member made of metal such as a magnesium alloy. The joint 50c is coupled to one end portion of the first frame 52a using a fastener 50g or the like, and also is coupled to the other end portion of the second frame 52b using the fastener 50g or the like. The first frame 52a to which the first display unit 20a is attached and the second frame 52b to which the second display unit 20b is attached are fixed through the center joint 50c in a state where they are optically aligned with each other. By coupling both of the frames 52a and 52b through the joint 50c, change of the arrangement relationship of both of the frames 52a and 52b is made easy. In addition, when other parts are assembled, it is possible to make individual adjustment. This also makes it possible to make entire adjustment. Thus, influence of modification or correction is less likely to occur.

Figure 3:
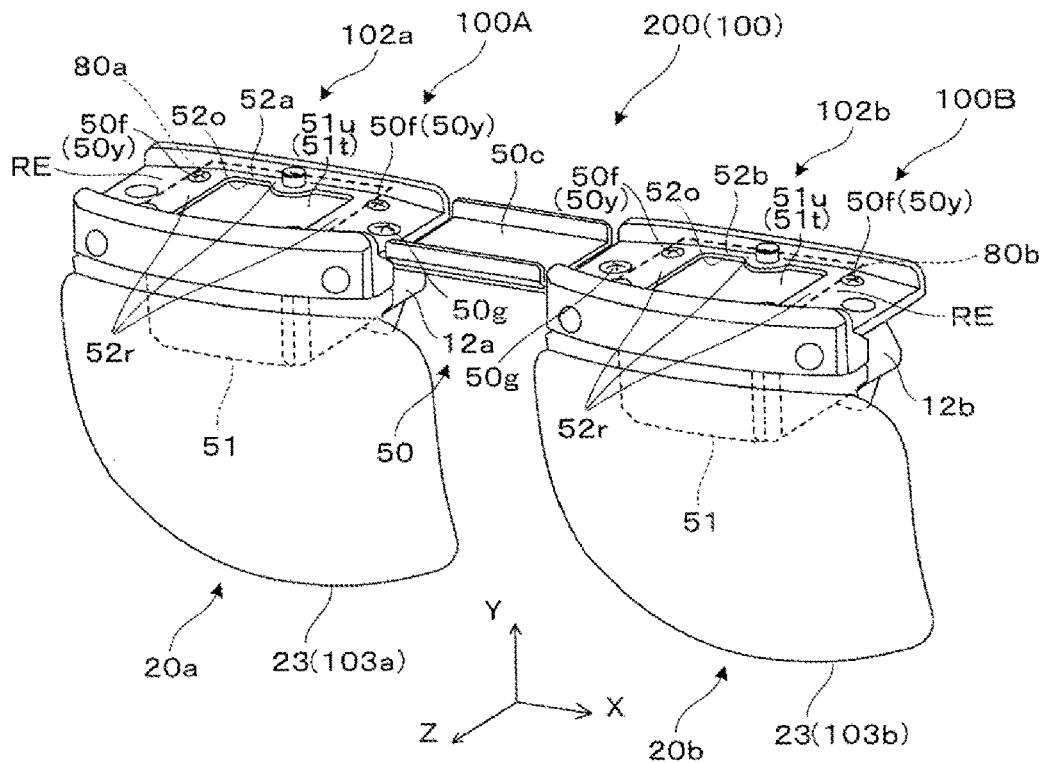
FIG. 3 is a perspective view illustrating a support structure of a display unit.
Figure 4:
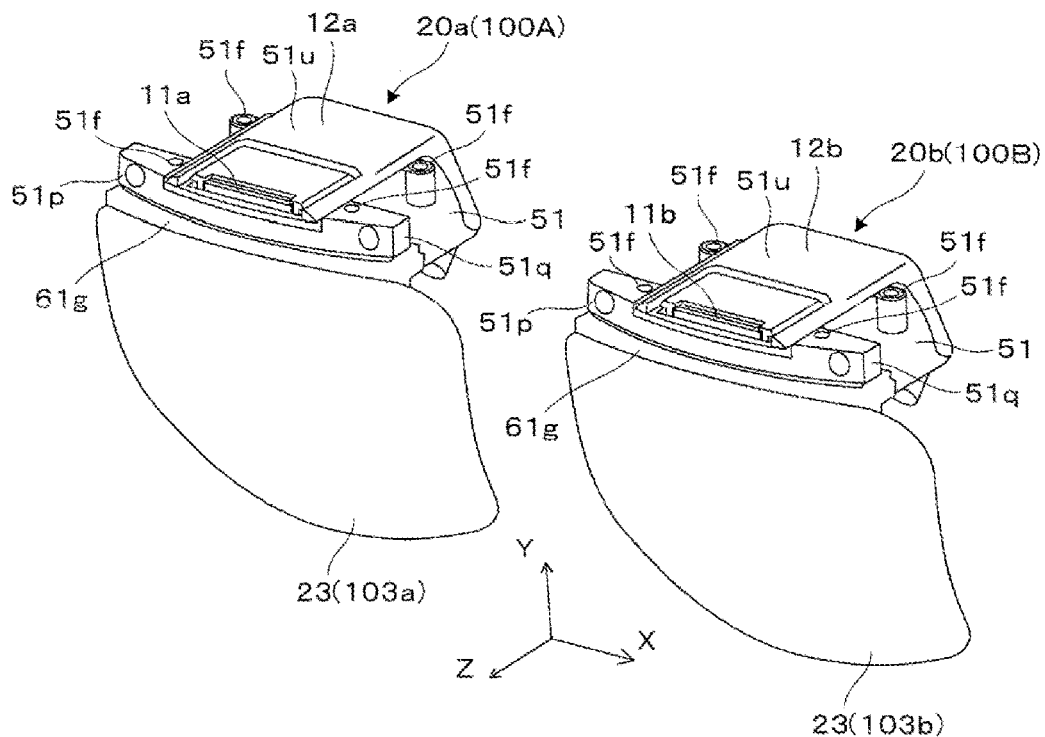
FIG. 4 is a perspective view illustrating the external shape of the display unit.

FIG. 4 is a perspective view illustrating a state where the support device 50 is excluded from the HMD 200 illustrated in FIG. 3. The first display unit 20a includes the first projection optical system 12a and the first combiner 103a in an integrated state. The second display unit 20b includes a second projection optical system 12b and the second combiner 103b in an integrated state. In the first projection optical system 12a, the first combiner 103a is fixed to the barrel 51 using a glue or the like in an aligned state. The barrel 51 of the first projection optical system 12a includes a space configured to accommodate the first image element 11a, and supports the first image element 11a in a state of being aligned relative to the projection lens 21 or the like illustrated in FIG. 2. In the second projection optical system 12b, the second combiner 103b is fixed to the barrel 51 using a glue or the like in an aligned state. The barrel 51 of the second projection optical system 12b includes a space configured to accommodate the second image element 11b, and supports the second image element 11b in a state of being aligned relative to the projection lens 21 or the like illustrated in FIG. 2.

In the first display unit 20a, a fastening portion 51f provided in the barrel 51 is, for example, a screw hole. By screwing the fastener 50f illustrated in FIG. 3 into it, it is possible to fix the upper portion 51u of the barrel 51 to the first frame 52a. In the second display unit 20b, a fastening portion 51f provided in the barrel 51 is, for example, a screw hole. By screwing the fastener 50f illustrated in FIG. 3 into it, it is possible to fix the upper portion 51u of the barrel 51 to the second frame 52b. A combination of the fastener 50f illustrated in FIG. 3 and the fastening portion 51f illustrated in FIG. 4 is referred to as a coupling portion 50y.

Figure 5:
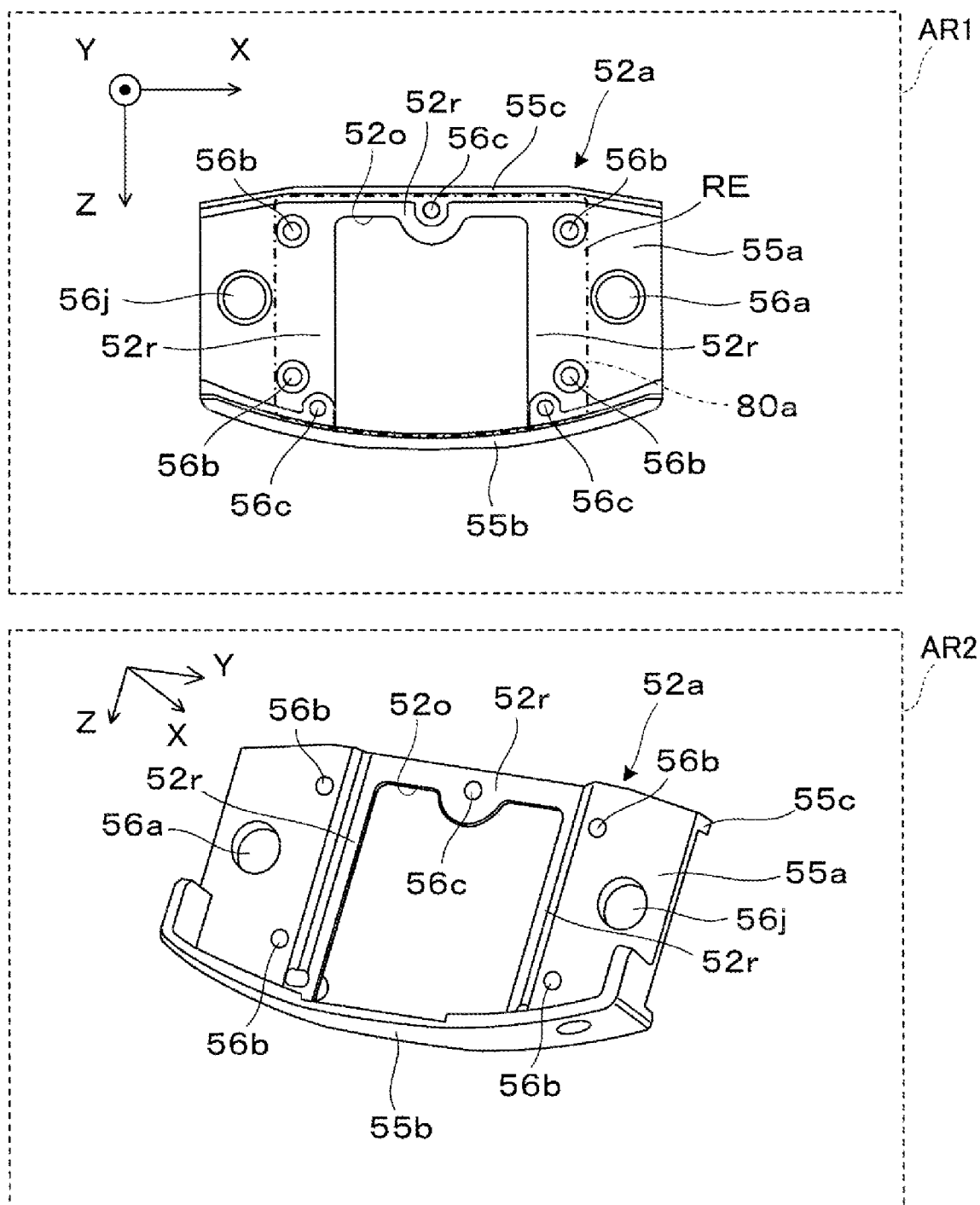
FIG. 5 is a plan view and a perspective view illustrating a frame configured to support the display unit.

FIG. 5 is a diagram illustrating the first frame 52a. In FIG. 5, the region AR1 illustrates a plan view of the first frame 52a, and the region AR2 illustrates a perspective view of the back side of the first frame 52a. The first frame 52a includes a flat plate portion 55a having a substantially rectangular shape as a whole and including an opening 52o, and a pair of reinforcing protrusions 55b and 55c protruding upward from the plate portion 55a. The first reinforcing protrusion 55b disposed at the front side that is the +Z side is provided along a front side of a pair of sides of the flat plate portion 55a extending in the longitudinal direction from among the outer periphery of the flat plate portion 55a. The first reinforcing protrusion 55b protrudes toward the upper side that is the +Y side and the lower side that is the −Y side, and extends in the lateral X direction as a whole while slightly curving. In addition, the second reinforcing protrusion 55c disposed at the rear side that is the −Z side is provided along a rear side of a pair of sides of the flat plate portion 55a extending in the longitudinal direction from among the outer periphery of the flat plate portion 55a. The second reinforcing protrusion 55c protrudes only toward the upper side that is the +Y side, and extends in the lateral X direction as a whole while slightly curving. The pair of reinforcing protrusions 55b and 55c are provided to enhance the structural strength of the first frame 52a, and increases the strength of the flat plate portion 55a that is relatively weak against bending and torsion.

In the first frame 52a, a hole 56a formed at one end is used to couple the first frame 52a to the joint 50c. In the first frame 52a, a hole 56j formed at the other end is used to couple the first frame 52a to the cover 53 (see FIG. 2) and an accessory thereof. In the first frame 52a, holes 56b formed at four locations in the periphery of the opening 52o are used to fix the first frame 52a to the upper portion 51u of the barrel 51. In other words, by screwing the fastener 50f illustrated in FIG. 3 into the fastening portion 51f illustrated in FIG. 4 through the holes 56b, it is possible to stably fix the first frame 52a to the upper portion 51u of the barrel 51.

In the first frame 52a, a space disposed above the flat plate portion 55a and interposed between the pair of reinforcing protrusions 55b and 55c is the recessed portion RE where the first circuit member 80a can be accommodated. Note that the height of an upper end of the first circuit member 80a may be higher than the height of upper ends of the pair of the reinforcing protrusions 55b and 55c. In the first frame 52a, screw holes 56c formed at three locations in the periphery of the opening 52o are used to fix the first circuit member 80a to the first frame 52a.

Although illustration is not given, the second frame 52b has a shape and structure in which the first frame 52a is inverted with respect to the left-right direction, that is, the ±X direction. Note that it may be possible that the first frame 52a itself has a symmetrical shape. In this case, the second frame 52b has the same shape as the first frame 52a without being inverted.

The outline shape of the flat plate portion 55a of the first frame 52a does not need to be a rectangular shape. It may be possible to change it on an as-necessary basis depending on the shape or application of the barrel 51. In addition, the shape of the opening 52o also does not need to be the rectangular shape. The pair of the reinforcing protrusions 55b and 55c are not limited to those extending along the longitudinal side of the flat plate portion 55a. They may extend along a portion of the longitudinal side of the flat plate portion 55a or may extend along a side other than the longitudinal side. In addition, they may be provided at the inside other than a side, so as to have a rib shape. The height of or the width of the pair of the reinforcing protrusions 55b and 55c may be changed on an as-necessary basis by considering the strength required for the first frame 52a, and the height or the width may be changed depending on positions.

Figure 6:
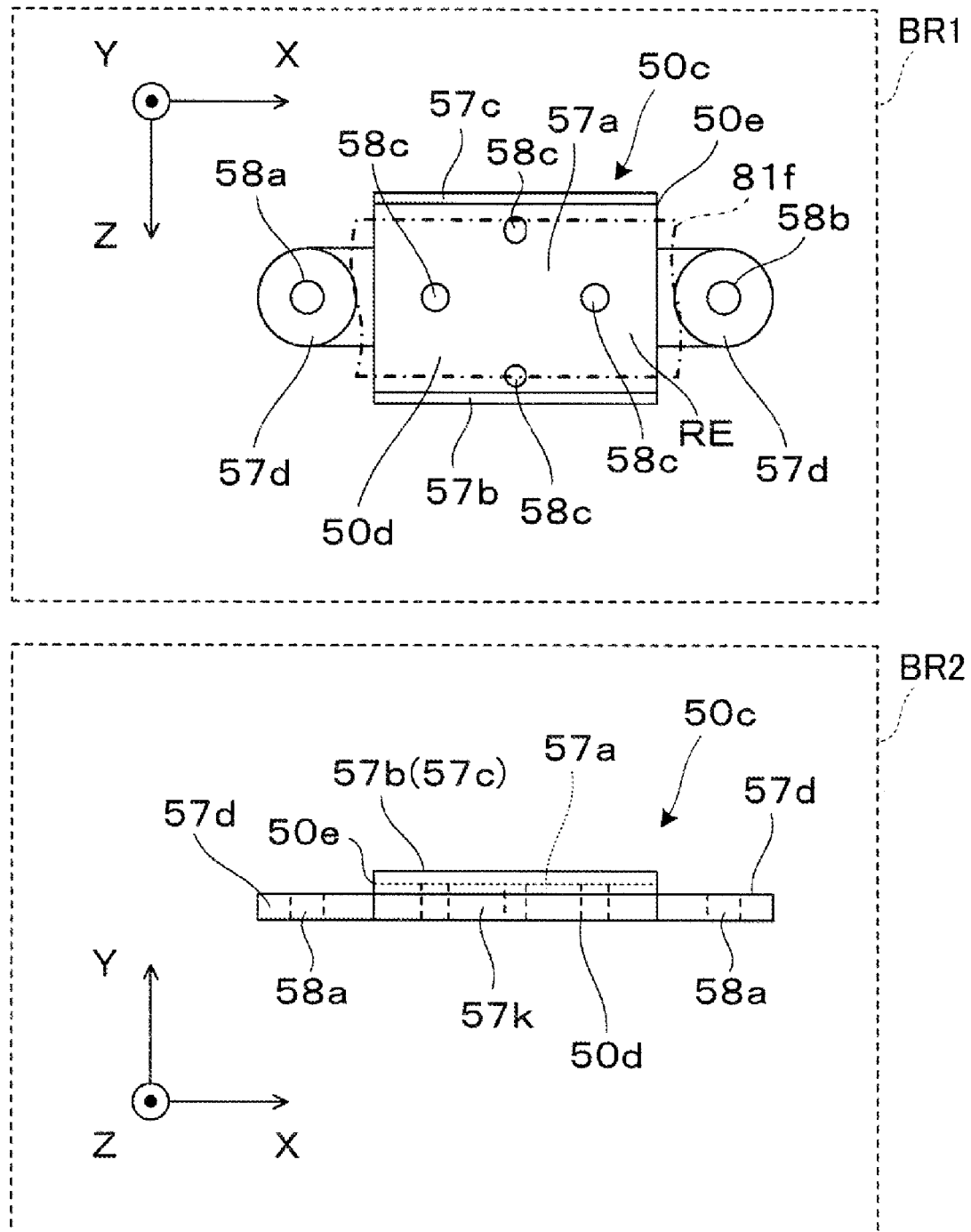
FIG. 6 is a plan view and a side view illustrating a joint configured to couple a pair of frames.

FIG. 6 is a diagram illustrating the joint 50c. In FIG. 6, the region BR1 illustrates a plan view of the joint 50c, and the region BR2 illustrates a side view of the joint 50c. The joint 50c includes a main body 50d and a pair of protrusion portions 57d. The main body 50d includes a lower plate 57k extending between the pair of protrusion portions 57d, and an upper plate 50e disposed on the lower plate 57k and integrated with the lower plate 57k. The upper plate 50e includes a flat plate portion 57a having a substantially rectangle shape as a whole, and a pair of reinforcing protrusions 57b and 57c protruding upward from the flat plate portion 57a. Both of the reinforcing protrusions 57b and 57c are provided along a pair of sides of the flat plate portion 57a that extend in the longitudinal direction from among the outer periphery of the flat plate portion 57a. Both of the reinforcing protrusions 57b and 57c protrude toward the upper side that is the +Y side, and extends in the lateral X direction. Both of the reinforcing protrusions 57b and 57c are provided to enhance the structural strength of the joint 50c. A fastening portion 58a provided at one of the pair of the protrusion portions 57d is provided so as to correspond to the hole 56a of the first frame 52a. By screwing the fastener 50g illustrated in FIG. 3 into the fastening portion 58a of the protrusion portion 57d through this hole 56a, it is possible to fix the first frame 52a to one end of the joint 50c while making alignment. Similarly, a fastening portion 58b provided at one of the pair of the protrusion portions 57d is provided so as to correspond to the hole 56a of the second frame 52b. This makes it possible to fix the second frame 52b to one end of the joint 50c while making alignment, although detailed description will not be given.

In the joint 50c, a space disposed above the flat plate portion 57a and interposed between the pair of reinforcing protrusions 57b and 57c is a recessed portion RE where the flexible cable 81f extending from the first circuit member 80a can be accommodated.

In the joint 50c, the shape of the flat plate portion 57a or the pair of the reinforcing protrusions 57b and 57c illustrated in the drawing is given merely as one example. It may be possible to modify, on an as-necessary basis, the outer shape or the thickness of the flat plate portion 57a or the arrangement, the height, the width, or the like of the reinforcing protrusions 57b and 57c, depending on applications of the image display device 100.

Four holes 58c are formed in the flat plate portion 57a of the main body 50d. These holes 58c are used to couple the joint 50c to the cover 53 (see FIG. 2).

Figure 7:
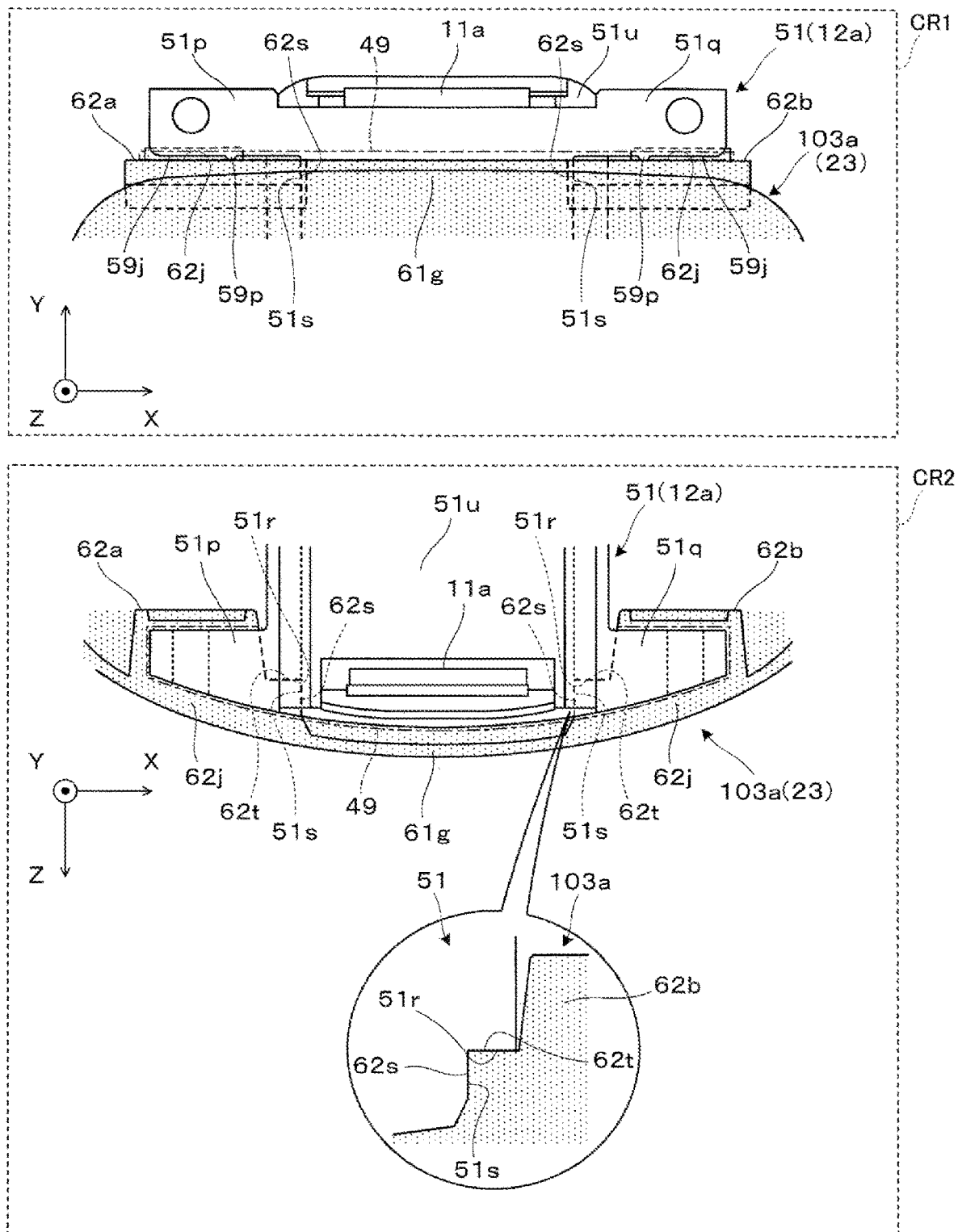
FIG. 7 is a front view and a plan view illustrating that a combiner is fixed to a barrel.

FIG. 7 is a diagram illustrating fixing of the first combiner 103a to the barrel 51, that is, fixing of the see-through mirror 23 to the first projection optical system 12a. In FIG. 7, the region CR1 illustrates a front view of the barrel 51 and the first combiner 103a, and the region CR2 illustrates a plan view of the barrel 51 and the first combiner 103a.

A pair of stick-out portions 51p and 51q are formed at the front side of the upper portion 51u of the barrel 51 so as to stick out outwardly in the lateral direction. In addition, a pair of attachment portions 62a and 62b are formed at an upper end 61g of the first combiner 103a so as to stick out inwardly. A pair of opposing inner side surfaces 62s of the pair of the attachment portions 62a and 62b are fitted with a pair of lateral side surfaces 51s of the barrel 51 that face outward with the lateral side surfaces 51s being interposed, and alignment in the ±X direction is performed so as to reduce a tilt. A pair of rear side surfaces 62t of the pair of the attachment portions 62a and 62b are in contact with a pair of step-shaped front side surfaces 51r of the barrel 51, and alignment in the ±Z direction is performed so as to reduce a tilt. In addition, a plurality of protruding portions 59p protruding from bottom surfaces 59j of the stick-out portions 51p and 51q are in contact with a pair of upper surfaces 62j of the pair of the attachment portions 62a and 62b, and alignment in the ±Y direction is performed. After alignment described above is performed, that is, after alignment in six axes is performed, a glue 49 is supplied from the periphery to between the bottom surfaces 59j of the stick-out portions 51p and 51q and the upper surfaces 62j of the attachment portions 62a and 62b. Then, the supplied glue 49 is cured using ultraviolet light or the like, and fixing of the first combiner 103a to the barrel 51 is completed. As described above, the first combiner 103a is aligned with the barrel 51 through the attachment portions 62a and 62b with respect to the left-right, front-rear, and upward-downward directions.

Alignment or positioning of the first combiner 103a relative to the barrel 51 is not limited to those using fitting as described above (combination of the lateral side surface 51s and the inner side surface 62s) or using contacting or biasing (combination of the front side surface 51r and the rear side surface 62t or the like). Another member may be involved. Furthermore, in addition to fixing using an adhesive, the method of fixing the first combiner 103a to the barrel 51 may include using various methods such as fixing using a screw, fixing using caulking, or fixing using fitting.

Figure 8:
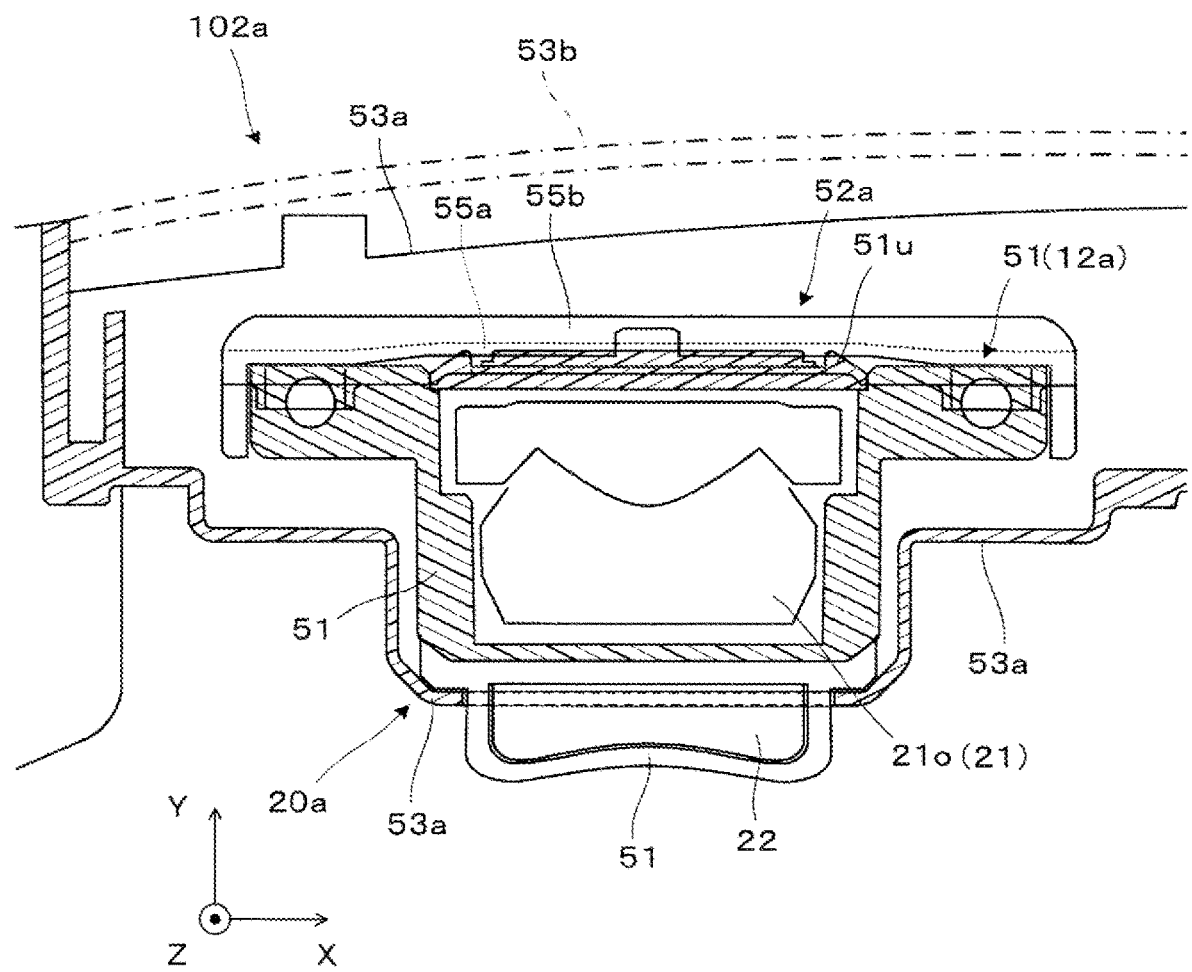
FIG. 8 is a conceptual view illustrating the front cross-sectional structure of a display device at one side.

FIG. 8 is a front cross-sectional view illustrating the first display driving unit 102a of the first display device 100A illustrated in FIG. 1. The barrel 51 holds, inside thereof, the first lens 21o and the like that constitute the projection lens 21. The first frame 52a is fixed at the upper portion 51u of the barrel 51. The first frame 52a supports the first display unit 20a including the barrel 51 to determine the arrangement. A lower cover 53a is disposed so as to cover the lower side of the barrel 51. The lower cover 53a is supported by the joint 50c or the first frame 52a illustrated in FIG. 3, and is coupled to the support device 100c illustrated in FIG. 1 at an end portion thereof at the left side illustrated in the drawing. An upper cover 53b is detachably attached to the lower cover 53a.

The image display device 100 according to the embodiment described above includes the display unit 20a including the projection optical system 12a and the combiner 103a in an integrated state, and also includes the frame 52a configured to support the display unit 20a. In the display unit 20a, the upper portion 51u is in contact with the periphery of the opening 52o of the frame 52a and is fixed in a hung state. The frame 52a includes, at an upper side, the recessed portion RE at which the circuit member 80a is disposed. In this case, the display unit 20a including the projection optical system 12a and the combiner 103a integrated with each other is supported by the frame 52a. This makes it easy to increase and maintain the optical manufacturing accuracy. More specifically, the display unit 20a is integrated and is independent of the frame 52a. This makes it possible to reduce the number of parts, which results in a reduction in assembling errors. In addition, this makes it easy to achieve a dust-proof measure within the barrel 51 of the display unit 20a, and also increase the degree of freedom in design. Furthermore, as the recessed portion RE used to dispose the circuit member 80a is provided at the frame 52a, it is possible to enhance the independency of the display unit 20a and the circuit member 80a of each other while reducing the size of the image display device 100.

In particular, the embodiment described above includes: the first display unit 20a including the first projection optical system 12a and the first combiner 103a in an integrated state; the second display unit 20b including the second projection optical system 12b and the second combiner 103b in an integrated state; the first frame 52a configured to support the first display unit 20a; and the second frame 52b configured to support the second display unit 20b, in which the first display unit 20a includes the upper portion 51u that is in contact with a periphery of the opening 52o of the first frame 52a and is fixed in a hung state, the second display unit 20b includes the upper portion 51u that is in contact with a periphery of the opening 52o of the second frame 52b and is fixed in a hung state, the first frame 52a includes the first recessed portion RE disposed at the upper side and used to dispose the first circuit member 80a, and the second frame 52b includes the second recessed portion RE disposed at the upper side and used to dispose the second circuit member 80b. In this case, the first display unit 20a is supported using the first frame 52a, and the second display unit 20b is supported using the second frame 52b. This makes it easy to increase and maintain the optical manufacturing accuracy. In addition, the first frame 52a and the second frame 52b each include the recessed portion RE used to dispose the first circuit member 80a and the second circuit member 80b, respectively. This makes it possible to enhance the independency of the first display unit 20a and the first circuit member 80a of each other while reducing the size of the image display device, and also makes it possible to enhance the independency of the second display unit 20b and the second circuit member 80b of each other.

Modification Examples and so on

The present disclosure has been described using the embodiments. However, the present disclosure is not limited to the embodiments described above and can be implemented in various modes without departing from the spirit of the disclosure. For example, the following modifications are possible.

In the description above, the HMD 200 includes the first display device 100A and the second display device 100B. However, the HMD 200 or the image display device 100 may be configured such that only the first display device 100A or the second display device 100B is supported in front of an eye using a support device 100C.

In addition to a magnesium alloy, the first frame 52a and the second frame 52b may be also made of an aluminum alloy or other metal.

The description above has been made of a case in which the first display unit 20a is screwed to the first frame 52a. However, the number of locations where the first display unit 20a is fixed to the first frame 52a is not limited to four, and various locations are possible. In addition, it may be possible to employ fixing in a continuously extending line manner or surface manner.

It may be possible to perform coupling such that the first projection optical system 12a or the first combiner 103a is hung on the first frame 52a, thereby performing fixing. In this case, the first projection optical system 12a or the barrel 51 does not need to be fixed to the first combiner 103a. As for the method of hanging the first combiner 103a on the first frame 52a, it is possible to use a method similar to the method used to hang the first projection optical system 12a or the barrel 51 on the first frame 52a.

In the description above, the first frame 52a and the second frame 52b are coupled through the joint 50c. However, it may be possible to employ a configuration in which the first frame 52a and the second frame 52b are directly coupled to each other, or a configuration in which the first frame 52a, the second frame 52b, and the joint 50c are integrated with each other to be a metal component.

In the description above, it is assumed that the image display device 100 is worn on the head and is used. However, the image display device 100 may also be used as a handheld display that is not worn on the head and is to be looked into like binoculars. In other words, the head-mounted display also includes a hand-held display in the present disclosure.

The image display device according to the specific aspect includes: the display unit including the projection optical system and the combiner in an integrated state; and the frame configured to support the display unit, in which the display unit includes an upper portion that is in contact with the periphery of the opening of the frame and is fixed in a hung state, and the frame includes, at an upper side thereof, a recessed portion at which the circuit member is disposed.

With the image display device, the display unit configured such that the projection optical system and the combiner are integrated is supported by the frame. This makes it easy to increase and maintain the optical manufacturing accuracy. In addition, as the frame is provided with the recessed portion used to dispose the circuit member, it is possible to enhance the independency of the display unit and the circuit member of each other while reducing the size of the image display device.

In the image display device according to the specific aspect, the frame includes the coupling portion configured to fix the upper portion of the display unit. In this case, the display unit can be attached to the frame after the display unit is assembled. This makes it easy to achieve the optical accuracy of the display unit.

In the image display device according to the specific aspect, the combiner is aligned with a barrel configured to hold the projection optical system, and is fixed with glue. In this case, it is possible to precisely align the combiner and the projection optical system through the barrel. This secures the relative fixing between the combiner and the projection optical system.

In the image display device according to the specific aspect, the combiner includes a pair of attachment portions formed so as to stick out inwardly, and is aligned with the barrel through the attachment portions.

In the image display device according to the specific aspect, the barrel supports an image element configured to output image light to the projection optical system. In this case, it is possible to precisely align the image element and the projection optical system through the barrel. This secures the relative fixing between the image element and the projection optical system.

In the image display device according to the specific aspect, the frame includes a flat plate portion including an opening, and a pair of reinforcing protrusions protruding upward from the flat plate portion. In this case, the structural strength of the frame increases. This makes it easy to stabilize the support of the display unit.

In the image display device according to the specific aspect, the pair of reinforcing protrusions are provided along a pair of sides of an outer periphery of the flat plate portion, the pair of sides extending in a longitudinal direction of the flat plate portion. In this case, the bending strength of the flat plate portion in the longitudinal direction increases. This makes it easy to maintain the support strength of the display unit.

In the image display device according to the specific aspect, the display unit is an off-axis optical system disposed along an optical path portion bent along a reference plane extending in a vertical direction, the projection optical system includes a plurality of optical elements, and one optical element of the plurality of optical elements includes a reflection surface. In this case, the display unit is arranged in the vertical direction involving the optical path being bent twice. This makes it possible to reduce the size of the display unit, which makes it easy to hang the display unit at the opening of the frame.

The image display device according to the specific aspect includes: the first display unit including the first projection optical system and the first combiner in an integrated state; the second display unit including the second projection optical system and the second combiner in an integrated state; the first frame configured to support the first display unit; and the second frame configured to support the second display unit, in which the first display unit includes the upper portion that is in contact with the periphery of the opening of the first frame and is fixed in a hung state, the second display unit includes the upper portion that is in contact with the periphery of the opening of the second frame and is fixed in a hung state, the first frame includes the first recessed portion disposed at the upper side and used to dispose the first circuit member, and the second frame includes, at the upper side, the second recessed portion at which the second circuit member is disposed.

With the image display device, the first display unit configured such that the first projection optical system and the first combiner are integrated is supported by the first frame, and the second display unit configured such that the second projection optical system and the second combiner are integrated is supported by the second frame. This makes it easy to increase and maintain the optical manufacturing accuracy. In addition, as the first frame and the second frame each include a recessed portion used to dispose the first circuit member and the second circuit member, respectively, it is possible to enhance the independency of the first display unit and the first circuit member of each other while reducing the size of the image display device, and it is also possible to enhance the independency of the second display unit and the second circuit member of each other.

The image display device according to the specific aspect includes a joint configured to couple and relatively fix the first frame and the second frame. In this case, it is possible to couple the first frame and the second frame through the joint while making alignment.

In the image display device according to the specific aspect, the first frame and the second frame have an identical shape, and the first frame includes a flat plate portion including an opening, and a pair of reinforcing protrusions protruding upward from the flat plate portion.

In the image display device according to the specific aspect, the pair of reinforcing protrusions are provided along a pair of sides of an outer periphery of the flat plate portion, the pair of sides extending from the first frame toward the second frame in an arraying direction.

What is claimed is:

1. An image display device comprising:
a display unit including a projection optical system and a combiner in an integrated state; and
a frame configured to support the display unit, wherein
the display unit includes an upper portion that is in contact with a periphery of an opening of the frame and is fixed in a hung state, and
the frame includes, at an upper side thereof, a recessed portion at which a circuit member is disposed.

2. The image display device according to claim 1, wherein the frame includes a coupling portion configured to fix the upper portion of the display unit.

3. The image display device according to claim 1, wherein the combiner is aligned with a barrel configured to hold the projection optical system, and is fixed with glue.

4. The image display device according to claim 3, wherein the combiner includes a pair of attachment portions formed so as to stick out inwardly, and is aligned with the barrel through the attachment portions.

5. The image display device according to claim 3, wherein the barrel supports an image element configured to output image light to the projection optical system.

6. The image display device according to claim 1, wherein the frame includes:
a flat plate portion including the opening; and
a pair of reinforcing protrusions protruding upward from the flat plate portion.

7. The image display device according to claim 6, wherein the pair of reinforcing protrusions are provided along a pair of sides of an outer periphery of the flat plate portion, the pair of sides extending in a longitudinal direction of the flat plate portion.

8. The image display device according to claim 1, wherein
the display unit is an off-axis optical system disposed along an optical path portion bent along a reference plane extending in a vertical direction,
the projection optical system includes a plurality of optical elements, and
one optical element of the plurality of optical elements includes a reflection surface.

9. An image display device comprising:
a first display unit including a first projection optical system and a first combiner in an integrated state;
a second display unit including a second projection optical system and a second combiner in an integrated state;
a first frame configured to support the first display unit; and
a second frame configured to support the second display unit, wherein
the first display unit includes an upper portion that is in contact with a periphery of an opening of the first frame and is fixed in a hung state,
the second display unit includes an upper portion that is in contact with a periphery of an opening of the second frame and is fixed in a hung state,
the first frame includes, at an upper side thereof, a first recessed portion at which a first circuit member is disposed, and
the second frame includes, at an upper side, a second recessed portion at which a second circuit member is disposed.

10. The image display device according to claim 9, comprising
a joint configured to couple and relatively fix the first frame and the second frame.

11. The image display device according to claim 9, wherein
the first frame and the second frame have an identical shape, and
the first frame includes a flat plate portion including the opening, and a pair of reinforcing protrusions protruding upward from the flat plate portion.

12. The image display device according to claim 11, wherein
the pair of reinforcing protrusions are provided along a pair of sides of an outer periphery of the flat plate portion, the pair of sides extending from the first frame toward the second frame in an arraying direction.

* * * * *